United States Patent [19]

Hogan, III

[11] Patent Number: 4,674,783
[45] Date of Patent: Jun. 23, 1987

[54] REMOVABLE AUTOMOBILE BODY PROTECTIVE GUARD WITH LOCKABLE ATTACHMENT

[76] Inventor: William H. Hogan, III, 563 29th Ave., San Francisco, Calif. 94121

[21] Appl. No.: 912,180

[22] Filed: Sep. 25, 1986

Related U.S. Application Data

[63] Continuation of Ser. No. 614,036, May 25, 1984, abandoned, which is a continuation-in-part of Ser. No. 524,583, Aug. 19, 1983, abandoned.

[51] Int. Cl.⁴ ............................................. B60R 19/42
[52] U.S. Cl. ................................... 293/128; 293/155; 296/207; 24/334
[58] Field of Search ............ 293/1, 102, 118, 126–128, 293/155; 296/207; 280/770; 49/462; 24/329, 331, 332, 334, 490, 514, 522, 523, 525, 535, 569

[56] References Cited

U.S. PATENT DOCUMENTS

| | | | |
|---|---|---|---|
| 209,409 | 10/1878 | Lucas | 24/523 |
| 1,586,939 | 6/1926 | Bement | 24/569 |
| 2,248,170 | 7/1941 | Hansen | 24/525 |
| 2,452,406 | 10/1948 | Volkery et al. | 24/569 |
| 2,543,404 | 2/1951 | Harasty | 293/102 |
| 2,556,615 | 6/1951 | De Vaughn | 24/334 |
| 2,594,491 | 4/1952 | Persons | 293/1 |
| 2,889,165 | 6/1959 | Zientara | 293/128 |
| 3,215,456 | 11/1965 | Schmid | 24/334 |
| 3,604,069 | 9/1971 | Jensen | 24/332 |
| 4,002,363 | 1/1977 | James | 293/128 |
| 4,114,846 | 9/1978 | Petersen | 24/335 |
| 4,315,424 | 2/1982 | Jarman et al. | 24/525 |
| 4,363,507 | 12/1982 | Bays | 293/128 |

*Primary Examiner*—Randolph A. Reese
*Assistant Examiner*—Dennis H. Pedder
*Attorney, Agent, or Firm*—Irons & Sears

[57] ABSTRACT

Apparatus for protecting the finish of an automobile from damage caused by opening doors of other automobiles against the automobile protected by the apparatus of the present invention. A shock cord is mounted at the most effective location on the side of an automobile by using clamping devices which are removably affixed to the lips of the front and rear wheel wells at locations which best mount the shock cord for protecting the automobile. The clamping device includes a cord holder which is both rotatable and slidable with respect to a clamping portion of the device in order to allow clamping at all locations on the wheel wells with a generally horizontal shock chord.

4 Claims, 4 Drawing Figures

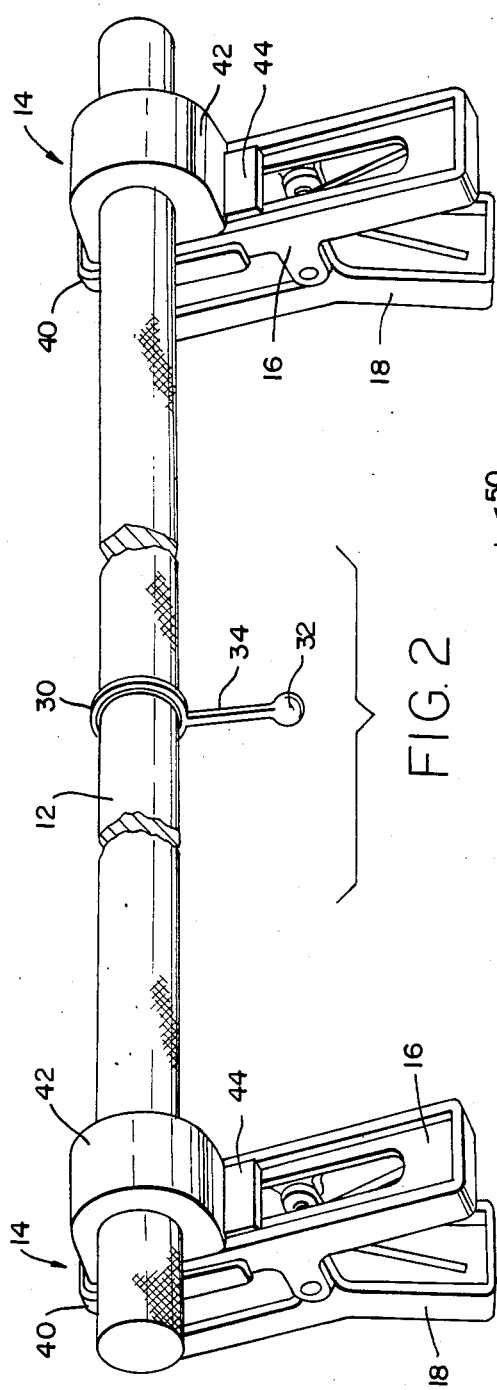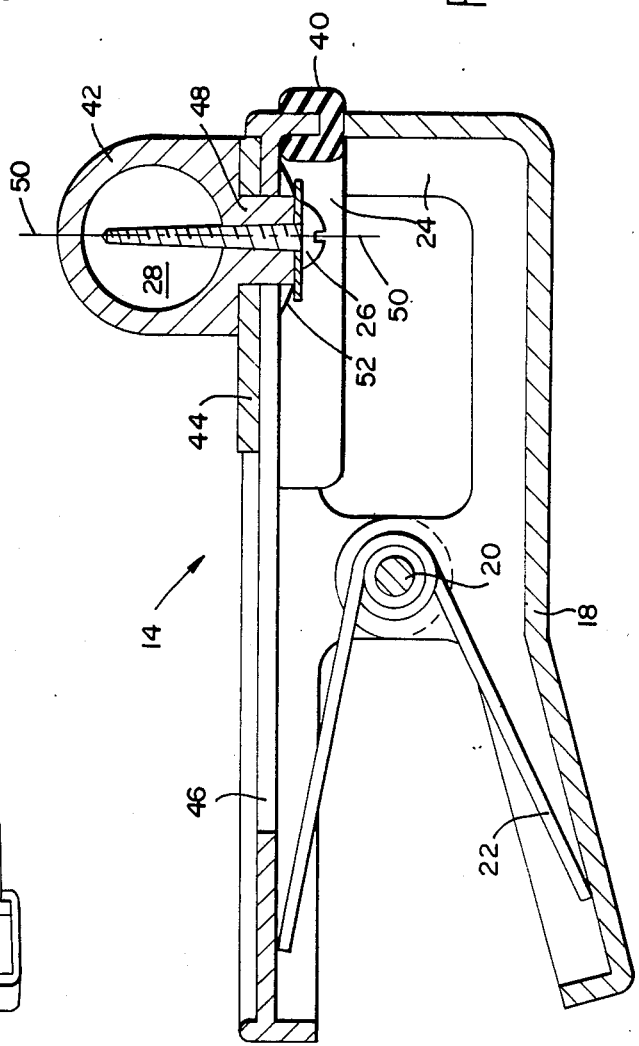

REMOVABLE AUTOMOBILE BODY PROTECTIVE GUARD WITH LOCKABLE ATTACHMENT

This application is a continuation of copending application Ser. No. 614,036, filed May 25, 1984, abandoned, which is a continuation-in-part of my copending application Ser. No. 524,583, filed Aug. 19, 1983, abandoned.

BACKGROUND OF THE INVENTION

1. Field of the Invention

The present invention relates generally to the use of clamps for mounting and positioning cords with lockable stubs on the sides of an automobile body to protect the automobile body from damage, such as marks, scratches and dents, caused by operators and passengers of other automobiles opening doors and striking the sides of the automobile equipped with the present invention.

2. Description of the Prior Art

When parked in parallel fashion in parking lots, the sides of automobile bodies are often damaged by the careless opening of the doors of adjacently parked automobiles. To protect the sides of some automobiles from such damage, manufacturers have positioned on the sides strips of protective molding. Often such protective molding is fabricated of plastic, and is attached to the sides of the automobile by multiple clipping devices. Since the protective molding is essentially permanently attached to the side of the automobile, its position on the side of the automobile and its width and extension from the side of the automobile are in part determined by the aesthetic contribution of the protective molding to the appearance of the automobile. Therefore, in almost all cases the appearance of the automobile imposes design constraints which severely restrict the protective capabilities of such moldings. Such design constraints often result in the molding being too narrow, and not having the molding protrude far enough from the sides of the automobile to accommodate automobile doors which do not initially impact the side of the automobile at the location of the protective molding.

Furthermore, many automobiles, especially the more expensive sport type automobiles, are manufactured without protective molding. Often such absence of permanent protective molding is dictated by aesthetic appearance considerations.

Prior removable protective devices which have been proposed to protect the sides of automobile bodies from door damage include the stretching of a wire rope along the sides of an automobile body, with one end of the wire rope attached to one of the automobile's bumpers and the other end of the wire rope attached to the other bumper. The use of a standoff center post and the tension of the mounted wire rope are intended to protect the side of the automobile body. A removable protective device of this general type is disclosed in U.S. Pat. No. 4,363,507. Other previously proposed temporarily attached protective devices utilize bumper like continuous tubes or interconnected tube sections which are attached to the sides of an automobile body by hooks positioned at the edges of doors or wheel wells. Some of these devices incorporate elongated attachments which can be wedged between a closed automobile door and the automobile body so that the protective device cannot be removed until the door is opened. Examples of these latter type of devices are disclosed in U.S. Pat. Nos. 2,889,165 and 4,002,363.

Among the problems associated with the prior removable protective devices are: (1) complexity in the method of installation on the side of the automobile body, for example, devices disclosed in U.S. Pat. No. 4,363,507; and (2) the limited capability to optimize the positioning of the devices to protect the sides of the automobile. This second disadvantage results from the fixed relationship of bumpers to the contours of the automobile sides, and the fact that wheel wells have curved lips as opposed to straight lips which means that hooks will only be retained at certain positions and not at others such as the top of wheel wells. Therefore, protection provided by prior removable devices can be severely, if not in many cases completely non-existent, because the side of the automobile and not the attached device absorbs the impact of doors opened against the side of the automobile. Further, certain prior devices only protect limited portions of automobile sides, such as only the doors and not the fenders.

SUMMARY OF THE INVENTION

For the present invention, a length of heavy shock cord is adjustably mounted against the side of an automobile by clipping spring loaded clamps to the lips of the front and rear wheel wells with the shock cord both rotationally and longitudinally attached to the spring loaded clamps, and also suspended between the spring loaded clamps. The spring loaded clamps with the shock cord adjustable mounted for both longitudinal movement along the length of the clamps and for rotation about the clamps can be clipped at any position on the lips of the front and rear wheel wells. Therefore, the shock cord can be mounted against the side of an automobile at an optimized position to assure that car doors of adjacently parked automobiles when opened will first impact the shock cord and not the side of the automobile equipped with the present invention. Positioned about the shock cord and between the spring loaded clamps in an embodiment of the present invention is a locking loop. This locking loop consists of a plastic covered wire loop encircling the shock cord with an essentially straight length of plastic covered wire having a ball end extending from the loop. When the spring loaded clamps are clipped to the wheel wells, the ball end on the locking loop is positioned at the section of the shock cord where an automobile door opens, and the ball end is placed in the automobile between the opened door and the automobile door frame. Closing and locking the door will thus, lock the shock cord to the automobile until the door is unlocked and opened.

BRIEF DESCRIPTION OF THE DRAWINGS

These and other objects, advantages and novel features of the present invention will be more readily apprehended from the following detailed description when read in conjunction with the appended drawings, in which:

FIG. 2 is a pictorial view of the removable automobile protective guard of the present invention shown in FIG. 1;

FIG. 3 is a sectional side view of the spring-loaded clamp; and,

Throughout the drawings, like reference numerals have been used to designate like parts.

DETAILED DESCRIPTION OF THE PREFERRED EMBODIMENT

Figure 1:
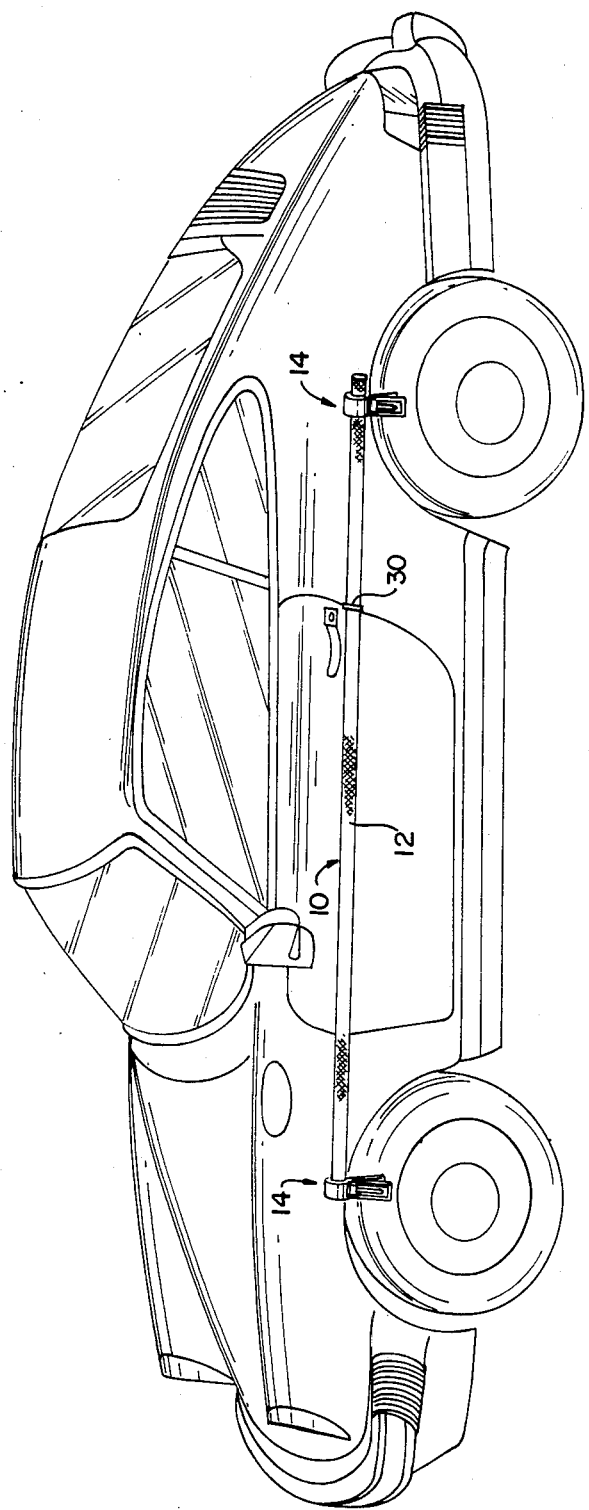
FIG. 1 is a perspective view of an automobile showing a mounted removable automobile protective guard of the present invention.
Figure 4:
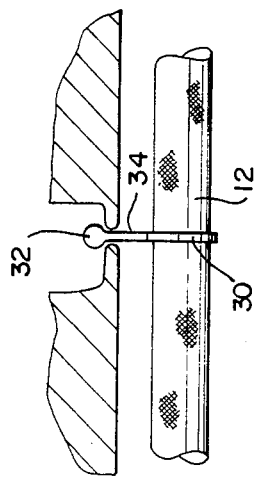
FIG. 4 is a fragmentary top view of the removable automobile protective guard of the present invention showing the locking loop.

A removable automobile protective guard 10 constructed in accordance with the principles of the present invention is illustrated in a mounted configuration on an automobile in FIG. 1, and in an unmounted pictorial view in FIG. 2.

The shock cord 12 of removable automobile protective guard 10 is a length of heavy cord. Shock cord 12 can, for example, be three quarters or one inch in diameter to provide both adequate impact absorption capabilities and sufficient stand-off from the automobile body to provide effective protection from door damage. A multiple rubber stranded cord having a woven nylon sleeve has been found to provide an adequate cord material for use as shock cord 12. Such a cord is sold under the trademark Royoda by Royoda S.A. 87, Rue de la Fraternite, 93106 Montrevil, CEDEX, France. Other compliant and stretchable heavy cords which resiliently react to impact and are weather resistant could also be used for shock cord 12.

At each end of shock cord 12 are attached spring-loaded clamping devices 14. Clamping devices 14 are designed to be affixed to the inner and outer surfaces of the front and rear wheel wells, i.e., fenders of the automobile as shown in FIG. 1. Each clamping device 14 is fabricated from molded halves 16 and 18 which are pivotally attached to each other by pin 20. About pin 20 is wound spring 22 which maintains the jaws 24 of each clamping device 14 in contact with each other or in gripping contact with any structure inserted between the jaws 24. The halves 16 and 18 of each clamping device 14 can be fabricated of a moldable plastic sold under the name Delrin by E. I. du Pont & Company, Wilmington, Del. The surface area of jaw 24 on upper half 16 is covered with several layers of bonded nylon and rubber to form a non-skid cushion 40 which precludes marring of the automobile finish at the locations where clamping devices 14 are attached.

Since clamping devices 14 can be attached and retained by the force of springs 22 at any location on the lip of the wheel wells on an automobile, the positioning of shock cord 12 can be optimized to assure effective interception of the edges of automobile doors opened against the vehicle on which the removable automobile protective guard 10 is mounted. Further, the clamping devices 14 are effectively attachable to the lips of all automobiles, and, therefore, multiple designs are not necessary.

The shock cord 12 is attached to the clamping devices 14 by screws 26. These screws 26 additionally attach the cord holder 42 to the upper half 16 of clamping devices 14. This attachment of the cord holder 42 is made such that the cord holder 42 and the spacer 44 can be slid along the slot 46 which is cut in the upper half 16 of clamping devices 14. Further, the round stub 48 which is positioned in a round hole provided in spacer 44 permits the cord holder 42 to be rotated about the axis 50 which is essentially defined by screw 26. Therefore, the cord holders 42 can be rotated with respect to the clamping devices 14 so that the clamping devices 14 can be affixed to automobile bodies at angles other than ninety degrees to the cord 12 without application of torque forces to the cord 12 about the longitudinal axis of the cord 12. Selected positioning of cord holder 42 in slot 46 and rotational positioning of cord holder 42 about axis 50 are retained by frictional forces applied by spring washer 52 which is positioned between the head of screw 26 and the underside of upper half 16.

The length of shock cord 12 can be selected and cut for use on automobiles of a certain manufacturer and a selected model prior to sale, or can be selected and cut by the purchaser of the automobile protective guard 10. Then by positioning an end of shock cord 12 in opening 28, screw 26 can be driven into shock cord 12 to retain the clamping device 14 to the shock cord 12, and to compress spring washer 52.

After the clamping devices 14 are mounted on the lips of the wheel wells of an automobile with the cord 12 conveniently positioned with respect to the clamping devices 14 the locking loop 30 can be moved to the edge of a partially opened door on the automobile and the ball end 32 can be positioned so that when the door is closed the ball 32 is pressed between the door edge and the automobile door frame. Locking the door will thus, lock the shock cord 12 to the automobile. Locking loop 30 is fabricated with a metal wire loop and with a wire extension 34 which is polyurethane coated.

The above discussions and realted illustrations of the present invention are directed primarily to preferred embodiments and practices of the inventor. However, it is believed that numerous changes and modifications in the actual implementation of the concepts described herein will be apparent to those skilled in the art, and it is contemplated that such changes and modifications may be made without departing from the scope of the invention as defined by the following claims.

I claim:

1. An automotive vehicle body protective device for removable attachment at selectable positions on the sides of automotive vehicles or the like, comprising:
   (a) a length of flexible and cushioning shock cord; and
   (b) clamping means, including a cord holder and a clamping device with jaws, adjustably attached at each end of said shock cord in such a manner that said clamping device can rotate with respect to said cord holder about an axis normal to said shock cord and said cord holder can slide along a longitudinal axis of said clamping device;
   whereby one of said clamping means is affixable on a first lip of one wheel-well on one side of said vehicle at all locations on said lip, and the second clamping means is affixable on a second lip of another wheel-well on the same side of said automotive vehicle at all locations on said second lip, the affixable selected locations being such as to position said shock.cord so as to be struck by the edges of doors on adjacent vehciles.

2. Protective device of claim 1, wherein said clamping means have a mar resistant surface on the jaw which is retained against an outer surface of said automotive vehicle.

3. Protective device of claim 1, wherein said clamping means use springs to retain jaw surfaces against said automotive vehicle.

4. Protective device of claim 1, wherein a locking loop means is mounted on said shock cord so that an extension of said locking loop means can be retained by a closed door of said automotive vehicle.

* * * * *